UNITED STATES PATENT OFFICE.

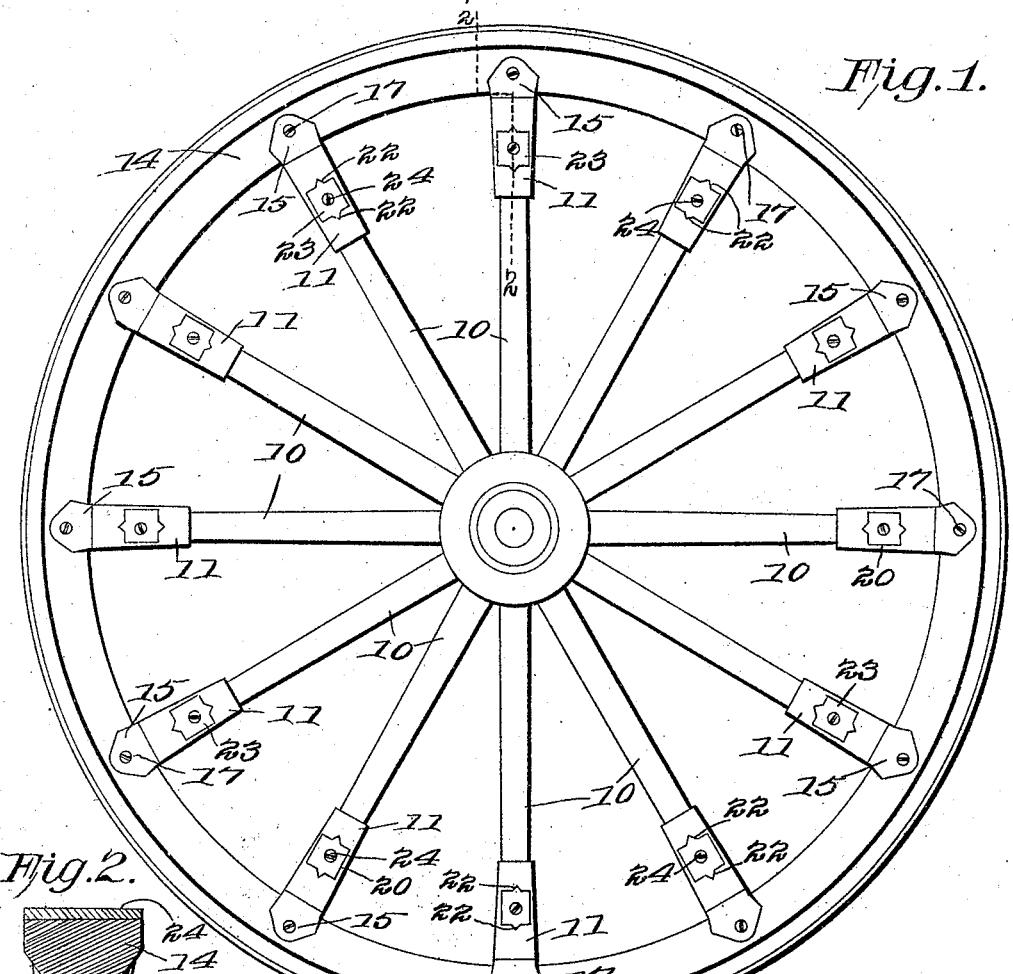

ELISHA F. EVANS, OF HOMERVILLE, GEORGIA.

VEHICLE-WHEEL.

No. 806,405.  Specification of Letters Patent.  Patented Dec. 5, 1905.

Application filed May 23, 1905. Serial No. 261,884.

*To all whom it may concern:*

Be it known that I, ELISHA F. EVANS, a citizen of the United States, residing at Homerville, in the county of Clinch and State of Georgia, have invented a new and useful Vehicle-Wheel, of which the following is a specification.

This invention relates to vehicle-wheels, and has for its object to provide a simply-constructed attachment whereby the tire may be tightened without removal from the felly for "resetting" or even removing from the axle-journal.

With these and other objects in view, which will appear as the nature of the invention is better understood, the same consists in certain novel features of construction, as hereinafter fully described and claimed.

In the accompanying drawings, forming a part of this specification, and in which corresponding parts are denoted by like designating characters, is illustrated the preferred form of embodiment of the invention capable of carrying the same into practical operation, it being understood that the invention is not necessarily limited thereto, as various changes in the shape, proportions, and general assemblage of the parts may be resorted to without departing from the principle of the invention or sacrificing any of its advantages.

In the drawings, Figure 1 is a side elevation of a wheel with the improvements applied. Fig. 2 is an enlarged sectional view on the line 2 2 of Fig. 1. Fig. 3 is a transverse section, enlarged, on the line 3 3 of Fig. 2. Fig. 4 is a side view, enlarged, of the combined spoke-socket and sleeve. Fig. 5 is a view of the adjusting-plug detached.

One of the improved devices will be attached to each spoke 10 of the wheel and consists of a sleeve 11, having a longtiudinal socket 12 in one end for movably receiving the outer end of the spoke, and with an internal screw-thread 13 at the other end, the threaded portion being preferably of less diameter than the socket portion, as shown in Fig. 2.

The felly 14 of the wheel is preferably of angular form in transverse section, as shown in Fig. 2, and attached to the inner face of the felly opposite each spoke is a clip 15, having a threaded stud 16 for engaging the threaded end of the sleeve and secured to the felly, as by screws or rivets 17.

Slidably disposed in the socket portion of the sleeve is a plug 18, bearing by one end upon the end of the spoke within the sleeve and provided at the other end with a threaded plug 19 for engaging the threaded portion of the sleeve. The plug 18 is also provided with transverse apertures 19', while the sleeve 11 is provided with an aperture 20 in one side opposite the plug-apertures.

The aperture 20 provides means for the insertion of a suitable implement, such as a small screw-driver or the like, into the apertures 19' for rotating the plug 18, and thus exerting a powerful strain longitudinally upon the spoke and outwardly against the felly.

With a wheel thus constructed with each spoke provided with one of the attachments it is obvious that a very strong outward strain may be imparted to the felly and the tire 21 encircling the same and keeping the same tight and also providing a ready means for tightening the tire in event of its working loose and without the necessity for resetting or even removing the wheel from the axle.

The apertures 20 are formed with V-shaped recesses 22 in opposite ends, and fitting the apertures are closures 23, having V-shaped projections fitting the recesses, as shown.

The closures are held in place by clamp-bolts 24 extending therethrough and likewise extending through the plug-apertures 19' and tapped into the opposite wall of the sleeve, as shown in Fig. 2. The clamp-bolts thus serve the twofold purpose of a means for holding the closure 23 in place and also locking the plugs from accidental rotation. By this means the plugs are effectually protected from dust and other foreign matter, while at the same time readily accessible when it is required to adjust the sleeves.

The device may be applied to any size of wheel and to wheels employed upon any of the various forms of vehicles in common use, and it is equally applicable to the lightest buggies or the heaviest farm-wagons or similar vehicles.

Having thus described the invention, what is claimed is—

1. In a wheel, a sleeve having an internal screw-thread and with a clip at one end for bearing against the wheel-felly and a longitudinal socket at the other end for movably receiving the free end of a spoke, a plug slidable in the socket portion of the sleeve and bearing upon the spoke therein and with a threaded stud engaging the threaded portion of said sleeve, and means for rotating said plug within the sleeve to produce a strain longitudinally upon the spoke.

2. In a wheel, a sleeve having an internal screw-thread at one end and a longitudinal socket at the other end for movably receiving the free end of a spoke, a clip for bearing against the wheel-felly and provided with a threaded plug for engaging the threaded end of the sleeve, a plug slidable in the socket portion of the sleeve for bearing upon the end of the spoke therein and provided with a threaded stud for engaging the threaded portion of the sleeve, and means for rotating said plug and its threaded stud.

3. In a wheel, a sleeve having an internal screw-thread and with a clip at one end for bearing against the wheel-felly and a longitudinal socket at the other end for movably receiving the free end of a spoke, and with an aperture in one side communicating with the socket portion, a plug slidable in the socket portion of the sleeve and bearing upon the spoke therein and with a threaded stud engaging the threaded portion of the sleeve and with transverse intermediate apertures for receiving a rotating implement inserted through said sleeve-apertures.

4. In a wheel, a sleeve having an internal screw-thread and with a clip at one end for bearing against the wheel-felly and a longitudinal socket at the other end for movably receiving the free end of a spoke, and with an aperture in one side communicating with the socket portion, a plug slidable in the socket portion of the sleeve and bearing upon the spoke therein and with a threaded stud engaging the threaded portion of the sleeve and with transverse intermediate apertures for receiving a rotating implement inserted through said sleeve-aperture, a closure for said sleeve-aperture, a clamp-screw extending through said closure and the apertures in said plug and engaging the sleeve opposite the aperture in the same.

5. In a wheel, the combination with a rim and a spoke, of a sleeve slidably embracing the spoke and bearing against the rim, the outer end of the sleeve being internally threaded, and a slidable plug contained within the sleeve with one end bearing against the spoke and its other end threaded and engaging the threads of the sleeve, the plug being rotatable to place a pressure longitudinally upon the spoke.

6. A spoke-tightener comprising a sleeve which is internally smooth at one end and also provided with an internally-threaded portion, and a rotatable and endwise-movable plug contained wholly within the sleeve and working in the smooth portion thereof and provided with a threaded part adjustably engaging the threads of the sleeve, the sleeve being provided with an opening to expose the plug for access to rotate the same.

7. A spoke-tightener comprising a sleeve which is internally smooth at one end and also provided with an internally-threaded portion, the smooth portion of the sleeve being provided with diametrically opposite openings, a rotatable and endwise-movable plug working in the smooth portion of the sleeve and having a threaded part adjustably engaging the threads of the sleeve, the plug being pierced by one or more openings for alinement with the openings of the sleeve, closures for the openings of the sleeves, and a removable fastening piercing the closures and passing through one of the openings of the plug whereby the latter is held against accidental rotation.

In testimony that I claim the foregoing as my own I have hereto affixed my signature in the presence of two witnesses.

ELISHA F. EVANS.

Witnesses:
SHEROD BURKHOLTER,
H. L. LANKFORD, Jr.